United States Patent [19]

Chatenever et al.

[11] Patent Number: 5,162,913

[45] Date of Patent: Nov. 10, 1992

[54] APPARATUS FOR MODULATING THE OUTPUT OF A CCD CAMERA

[75] Inventors: David Chatenever; Ralph D. Harris, both of Santa Barbara; Randal E. Stokes, Goleta, all of Calif.

[73] Assignee: Medical Concepts, Inc., Goleta, Calif.

[21] Appl. No.: 487,382

[22] Filed: Feb. 26, 1990

[51] Int. Cl.⁵ .................. H04N 3/14; H04N 5/335; H04N 5/30

[52] U.S. Cl. .................. 358/213.19; 358/209; 358/213.15; 358/98

[58] Field of Search .......... 358/98, 161, 174, 93, 358/209, 41, 43, 211, 213.19, 29, 29 C, 37, 213.18, 213.15; 128/6

[56] References Cited

U.S. PATENT DOCUMENTS

| | | | |
|---|---|---|---|
| 4,554,532 | 11/1985 | Ise et al. .............................. | 340/501 |
| 4,635,126 | 1/1987 | Kinoshita ........................... | 358/228 |
| 4,875,100 | 11/1989 | Yonemoto et al. ................ | 358/213.19 |
| 4,883,360 | 11/1989 | Kawada et al. .................... | 356/402 |
| 4,928,172 | 5/1990 | Uehara et al. ...................... | 358/98 |
| 4,959,727 | 9/1990 | Imaide et al. ...................... | 358/228 |
| 4,969,034 | 11/1990 | Salvati ................................. | 358/98 |
| 4,980,770 | 12/1990 | Dujardin ............................ | 358/213.16 |
| 4,987,482 | 1/1991 | Imai et al. ........................... | 358/41 |
| 5,008,757 | 4/1991 | Kimura et al. ..................... | 358/213.13 |

FOREIGN PATENT DOCUMENTS

| | | | |
|---|---|---|---|
| 0155117 | 6/1988 | Japan ..................................... | 358/98 |
| 0217412 | 8/1989 | Japan ..................................... | 358/98 |
| 1-305671 | 12/1989 | Japan . | |

OTHER PUBLICATIONS

Article: Imaide et al., "Long-Exposure Video Camera With Digital Memory", *IEEE International Conference on Consumer Electronics* (1988), p. 2.
A copy of the European Search Report is also enclosed.

*Primary Examiner*—James J. Groody
*Assistant Examiner*—Safet Metjahic
*Attorney, Agent, or Firm*—Elliott N. Kramsky

[57] ABSTRACT

A method and apparatus for automatically adjusting the exposure of video images of the type that are commonly generated during endoscopic examination of tissue. The output of a video amplifier is detected and compared with an ideal value. A corresponding adjustment of amplifier gain is determined and such adjustment compared with a predetermined optimum range of amplifier gain. In the event that the calculated adjustment lies within such optimum range, the gain of the amplifier is adjusted accordingly. In the event that the optimum range is exceeded by the absolute value of the calculated adjustment, the exposure time of the camera sensor and the gain of the amplifier are adjusted in opposite senses whereby the amplifier is continuously operated within its optimum range.

13 Claims, 2 Drawing Sheets

APPARATUS FOR MODULATING THE OUTPUT OF A CCD CAMERA

BACKGROUND

1. Field of the Invention

The present invention relates to methods and apparatus for controlling the image output of a video camera. More particularly, this invention pertains to a method and apparatus for regulating the image generated by a video camera of the charge coupled device (CCD) type.

2. Description of the Prior Art

The field of video endoscopy to which the present invention generally relates includes medical diagnostic and therapeutic disciplines that utilize endoscopes to penetrate and to view otherwise-inaccessible body cavities with minimal intrusion and surgical procedures. Conventional endoscopes can generally be categorized into two classes, namely rigid and flexible. Examples include the laparoscope, cystoscope, arthroscope, ureterscope, bronchoscope and colonoscope.

While providing a substantial technical advance, the utility of endoscopic instruments has been significantly increased by the development of video display processing. Video information display protects the vision of the physician, particularly in those instances where a highly-reflective medium is viewed under bright illumination. This often occurs in arthroscopic surgery where the high-intensity illumination of reflective articular tissue can cause injury to the retina.

The coupling of a video camera to an endoscopic probe, as opposed to direct viewing, promotes operator comfort and, hence, instrument utility. When using a camera, the physician needn't continually reposition himself at an eyepiece near the proximal end of the probe. An assistant can hold and position the instrument, leaving the operating physician's hands free to manipulate surgical tools. As the doctor and assistant can both view the image on a common monitor, prompt and accurate movement of the scope is assured throughout. Thus, tissue trauma is minimized.

The incorporation of a video camera into an endoscopic system permits both recordation and real time transmission of procedures, opening up many possibilities not available to conventional endoscopy including real time consultations (and teaching) at distant venues and significant documentation benefits.

The numerous benefits of video information display of data gathered through endoscopic examination depend, of course, upon the diagnostic quality of the resultant image. The level of illumination can vary dramatically as the distal end of the scope is manipulated during an endoscopic examination due to the geometrical relationship between light intensity and distance.

The standard method for controlling the exposure of a conventional video camera that must process video images subject to large "swings" in intensity is the diaphragm-like iris. Unfortunately, an iris is not appropriate for an endoscopic camera. Due to obvious physical constraints, the image diameter delivered through an endoscope must be relatively small (approximately one to two millimeters in diameter). Accordingly, the iris of an endoscopic camera would have to be controllable over a very small operating range. The design and maintenance of such a precision iris, if possible, would be an extremely difficult mechanical design task. In addition, the iris would require a waterproof environmental enclosure to allow for immersion in sterilizing fluids, further complicating design.

Due to the inherent difficulty of adapting a conventional iris to the above-described problems of the environment, endoscopic cameras conventionally rely upon an internal automatic gain control (AGC) to modulate the amplification of the signal amplitude that is output from its CCD's image collector sensors. Such an AGC is generally usefully capable of operation over a range of 4:1 or perhaps 8:1. In many cases this is inadequate to compensate for the vast differences in illumination that are encountered during an examination or procedure. Furthermore, an AGC can in no way compensate for a condition of saturation in the CCD where the capacity of photo sites to linearly convert light to electrons has been exceeded. As a result, the video image can obscure features of diagnostic or other significance.

SUMMARY OF THE INVENTION

The present invention addresses the problem of exposure control in a camera for use with an endoscope or otherwise by providing, in a first aspect, apparatus for modulating the signal, generated by a camera of the type that includes a CCD sensor and an output amplifier that is characterized by a predetermined, preferred range of gain, for driving a standard video display. Such apparatus includes means for measuring the amplifier output. Means are provided for converting the output to a parameter and for forming the difference between such parameter and a predetermined optimum value. Means are additionally provided for converting that difference into a corresponding correction to the amplifier gain and for comparing the correction with the preferred range of gain. Finally, means are provided for adjusting the gain of the amplifier and the charge accumulation time of the CCD sensor accordingly.

In another aspect, the invention provides a method for modulating the signal, generated by a camera of the type that includes a CCD sensor and an output amplifier that is characterized by a predetermined, preferred range of gain, for driving a standard video display. The output of the amplifier is measured and then converted to a parameter measuring the video intensity. The difference is formed between that parameter and a predetermined optimum value. Such difference is converted into a corresponding correction to amplifier gain and the correction is compared with the preferred range of gain. The gain of the amplifier and the charge accumulation time of the CCD sensor are adjusted in accordance with the relative values of the amplifier gain correction and the preferred range of gain.

The foregoing and additional features and advantages of the present invention will become further apparent from the description that follows. This description is accompanied by a set of drawing figures. Numerals of the drawing figures, corresponding to those of the written description, point to the various features of the invention, like numerals referring to like features throughout both the drawing figures and the written description.

DETAILED DESCRIPTION

Figure 1:
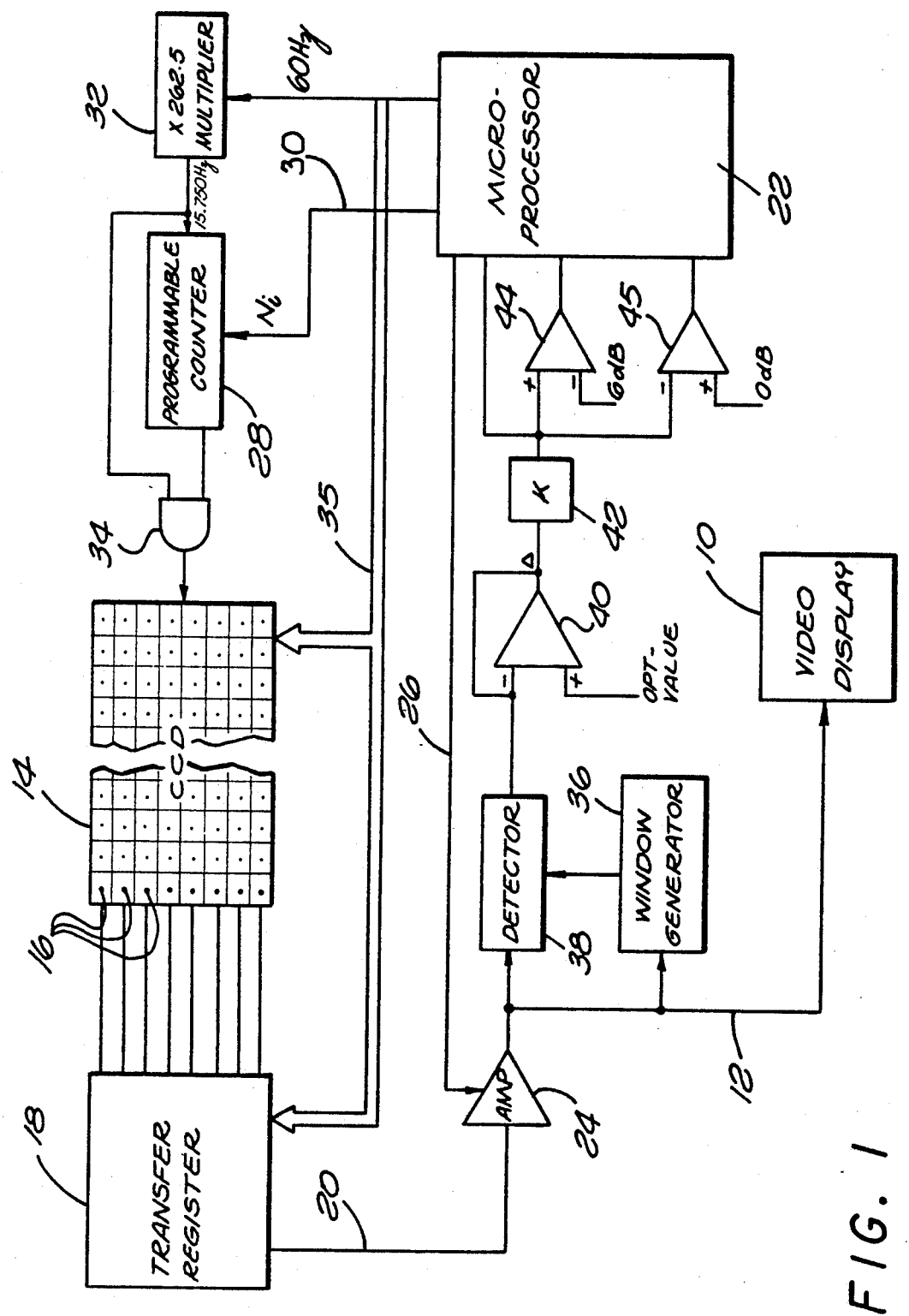
FIG. 1 is a block schematic diagram of an automatic exposure control circuit in accordance with the invention.

FIG. 1 is a block schematic diagram of a camera incorporating an automatic exposure control circuit in accordance with the present invention. The camera of the invention provides a signal that is properly formatted in accordance with a standard video protocol and transmitted to a video display 10. The display 10 is actuated by the video signal (transmitted via a conductor 12) to effectively re-create the optical image that is incident upon the "heart" of the camera, a one or two-dimensional CCD sensor 14.

The CCD sensor 14 comprises a plurality of distinct photo sites 16 arranged into a matrix of one or more rows and columns. As is well known, the incidence of illumination upon a photo site produces an underlying accumulation of charge. The geometry of the sensor 14, and the distribution of the photo sites 16 across the surface thereof, permits the generation of spatially-distributed, localized charge accumulations that correspond to the spatial distribution of intensities of the light across the sensor 14 that defines the incident image.

The charges accumulated in the photo sites are periodically removed and formed into a waveform for application to the video display 10. This waveform must, of course, comply with the protocol of the display 10. In a standard video display, the signal (which, in the present invention, is output from an on-chip transfer register 18 via a conductor 20) must generate a conventional video frame comprising 262.5 "lines", each having an individual "line time" of 63.6 microseconds. Accordingly, a total of 1/60 second is required to display an individual frame of video on the "conventional" or "standard" display 10. At the end of each 1/60 second period, the process of "writing over" the next frame, based upon the charge accumulated during the outputting of the prior frame on the display 10, is begun. A video frame or image is generated by application of the video signal to actuate a CRT gun that scans the screen of the display 10 through the aforementioned 262.5 lines at 63.6 microsecond line times, exciting the matrix of phosphors at the screen of the video display 10.

As mentioned, the tissue under endoscopic examination is imaged by exposure of the planar CCD sensor 14 to the reflectively-illuminated tissue to produce a spatially-varying distribution of charge that is subsequently transferred to the parallel-in, serial-out (PISO) on-chip transfer register 18. A microprocessor 22 that includes an internal 60 Hz system clock controls the clocking out of the charge.

In the present invention, the intensity of the displayed image is automatically controlled by an interactive process wherein the magnitude of the charge generated within the CCD sensor 14 and the gain of a video amplifier 24 are continually and cooperatively regulated in accordance with an algorithm that maximizes the effectiveness of each such process in relation to the effective modulation of the output of the amplifier 24. In the present invention, the gain of the video amplifier 24 is continually adjusted in accordance with the intensity of the prior video frame to maintain the system operating point within an optimum 6 dB amplifier operating range. This process may or may not involve the shuttering of the CCD sensor 14 depending upon the measured image intensity. Rather, the sensor 14 is shuttered only as a means for maintaining adjustments to the gain of the amplifier 24 within the optimum 6 dB range. Thus, the present invention improves upon the operation of prior art systems that are inherently limited in effectiveness by the gain-limited effectiveness of standard video amplifiers.

The two processes employed for (1) adjusting the gain of the amplifier 24 and (2) varying the degree of shuttering of the CCD sensor 14 to "adjust" the exposure time and, consequently, the amplitude of the video signal output of the amplifier 24, are effected by means of control signals applied to the amplifier 24 (via a conductor 26) and a programmable counter 28 (via a conductor 30). The input to the programmable counter 28 is a 15,750 Hz pulse train that is synchronized with the 60 Hz system clock. This high-frequency signal is generated by means of a (262.5 times) multiplier 32. A control bus 35 synchronizes the operations of the invention.

A circuit is provided for generating the information required by the microprocessor 22 to control the sensor 14 and the amplifier 24 which has a total range of operation of, for example, $-6$ dB to $+18$ dB. The amplified video signal output by the amplifier 24 is applied to a window generator 36 that detects only the circular area of the total picture that is occupied by the endoscopic image regardless of image diameter. The generator 36 selectively enables an amplitude detector-processor 38 over the active image area to eliminate any error that would otherwise be caused by variation in image diameter. The detector-processor 38 includes means for deriving a quantity representative of image intensity as detected by the sensor 14. That is, an appropriate weighting and/or averaging algorithm is embedded within the detector-processor 38 to provide, as output, a parameter indicative of a predetermined control variable (e.g. "mean signal amplitude" per frame). This output is applied to an operational amplifier 40 whereby such value is compared with an optimum video frame value of the parameter under examination.

The difference between the detected value and the optimum value is applied to a converter 42 that computes the corresponding adjustment (analog difference signal) that must be made to the gain of the amplifier 24 to bring the measured parameter into line with the optimum value. This correction is simultaneously applied to a pair of comparators 44 and 45 and to the microprocessor 22. A 6 dB reference signal is applied to the comparator 44 and a 0 dB reference signal is applied to the comparator 45 in such a way that, in combination, the comparators 44 and 45 can determine whether the output of the amplifier lies in the preferred 0 dB to 6 dB range of values. In the event that a positive value is ascertained at the comparator 44 (that is, a correction of greater than 6 dB is required) the output of the comparator 44 goes "high" (value "one") while, in the event that the correction does not exceed 6 dB, the output of the comparator 44 goes "low". Similarly, the output of the comparator 45 goes high when a positive value is ascertained at that comparator. Since a 0 dB signal is applied to the positive port of the comparator 45, a correction of less than 0 dB (indicating a negative value, beneath and outside the optimum operating range) is thereby determined.

Figure 2:
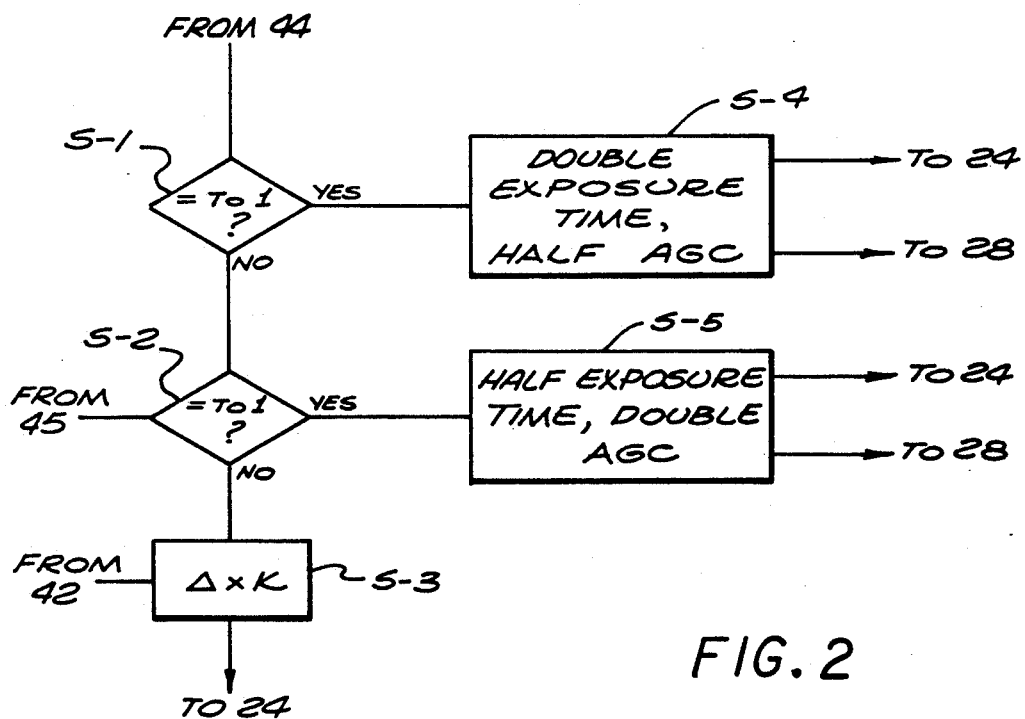
FIG. 2 is a flow diagram that illustrates the process control functions of the microprocessor of the present invention.

FIG. 2 is a flow diagram of the process control of the microprocessor 22. As described above, the microprocessor 22 receives outputs from the comparators 44 and 45 and from the converter 42 that are indicative (in combination) of the magnitude of the adjustment to amplifier 24 gain that is required. At step S-1, the output of the comparator 44 is examined to determine whether the output of the comparator 44 is high or low (i.e. a "one" or a "zero"). In the event that the output is determined to be "low", the microprocessor proceeds to step S-2 where a like inquiry is of the output of the comparator 45. In the event that neither of steps S-1 or S-2 yields a positive interrogation, the method proceeds to step S-3 where the output of the converter 42 is converted into a corresponding adjustment to the gain of the amplifier by adjusting the current supplied thereto via the conductor 26. This process takes place during a 1/60 second frame time and thus the present, adjusted gain of the amplifier 24 reflects the value of the image as measured during the prior frame.

In the event, however, that it were determined that the output from the comparator 44 was "high" indicating a required adjustment of greater than 6 dB, the internal logic of the microprocessor 22 would proceed to step S-4. (As mentioned earlier, the optimum range of effective operation of a video amplifier is limited to 0 dB to 6 dB.) and a two-fold process would be implemented. Such process involves the cooperative (1) doubling of the exposure time of the CCD sensor 14 and (2) reduction of the gain of the amplifier 24 by 6 dB. The net result of such combined action is to produce no net change in the amplitude of the signal output from the amplifier 24 while shifting the operating point of the amplifier so that it is maintained within its ideal or optimum operating range of 0 to +6 dB. In the event that it were determined at step S-2 that the output of the comparator 45 indicated an adjustment outside and at the other end of the optimum range were required, step S-5 would be implemented, halving the CCD exposure time and doubling the gain of the amplifier 24. Once again, the ideal operating range of 0 to +6 dB would be reached. Thus, fine, continuous control is performed by the amplifier 24 while the shutter system of the CCD sensor 14 is utilized to maintain a nominal output from the CCD over a wide range of values of incident illumination.

FIGS. 3(a) through 3(d) are a series of waveforms for illustrating the shuttering of the CCD sensor 14 (i.e. adjustment of exposure time) for effecting the complete operation of the present invention. As mentioned earlier, the adjustment of the exposure time of the sensor 14 acts in conjunction with the adjustment to the gain of the amplifier 24 to maintain the optimum operating range of the amplifier 24 throughout. In this way, the combined actions of shuttering the CCD sensor and adjusting the gain of the amplifier 24 interact to provide continual automatic exposure adjustment. The adjustment of the exposure time of the CCD sensor 14 is undertaken in accordance with the invention so that the gain of the amplifier 24 may be maintained in a region whence the output video signal is not subject to the excessive noise that characterizes prior art CCD-based cameras that rely solely upon automatic gain control to regulate the amplifier output. Furthermore, since the CCD is shuttered, levels of incident light can be accommodated that exceed by several orders of magnitude the intensity levels that could have been handled by a non-shuttered CCD.

The invention is not limited in operation to any particular scheme for adjusting the exposure time of the CCD sensor 14. The scheme of FIGS. 3(a) through 3(d) is of a well-known type wherein the accumulation of charge is limited by the application of pulsed discharge signals which can occur only during the horizontal sync of the video waveform. In a standard video display 10, 262.5 lines are scanned in a frame time of 1/60 second or 16.7 milliseconds. Thus, as mentioned above, each "line time" for scanning an individual line of the frame takes 63.6 microseconds. In such a sensor 14, the pulsed discharge signals effectively delay the onset of charge accumulation or integration during each 1/60 second period during which a (prior scanned) frame is displayed. The discharge pulse repetition rate is 15,734 pulses per second and the discharge pulse period is 63.6 microseconds, corresponding to the horizontal sync frequency and period to effect shuttering in accordance with the shuttering scheme employed. The integration time (per frame) of a sensor 14 in accordance with the foregoing is, therefore, defined as follows:

$$16.7 - [N \times 63.6 \times 10^{-3}] \text{ milliseconds}$$

In the above equation, N represents an integral number. For long exposure times (N a small number) incrementing or decrementing N by "1" does not represent a significant change. For instance, if N=1 then the exposure time is $16.7 - (1) 63.6 \times 10^{-3} = 16.64$ milliseconds. When N is incremented to "2", the exposure time becomes $16.7 - (2) 63.6 \times 10 - 3 = 16.57$ milliseconds. Thus, increasing N from 1 to 2 decreases the exposure time by approximately 0.4 per cent. When the exposure times are very short (e.g. N>200), a single count change in N represents a perceptible, discontinuous change in sensitivity in contrast to the prior example. For example, when N changes from 250 to 251, the exposure time changes by close to 8 per cent. The resolution under such conditions is too coarse to be useful as a continuous control function in a feedback loop. Thus, a "shutter only" exposure control scheme would be subject to unacceptable nonlinearities. In the present invention, as discussed with reference to FIG. 2, the integration time of the CCD sensor 14 is incremented or decremented by a factor of "2". That is, the exposure setting of the sensor 14 is either double or half the exposure time of the prior frame when the output of the comparator 44 goes "high". As discussed with reference to that figure, this drastic change in sensitivity is compensated by the simultaneous adjustment of the gain of the amplifier 24 precisely inverse to the "shuttering" effect. As a consequence, the change in exposure (or integration time of the frame) is exactly compensated, resulting in no net change in the signal amplitude.

Figure 3:
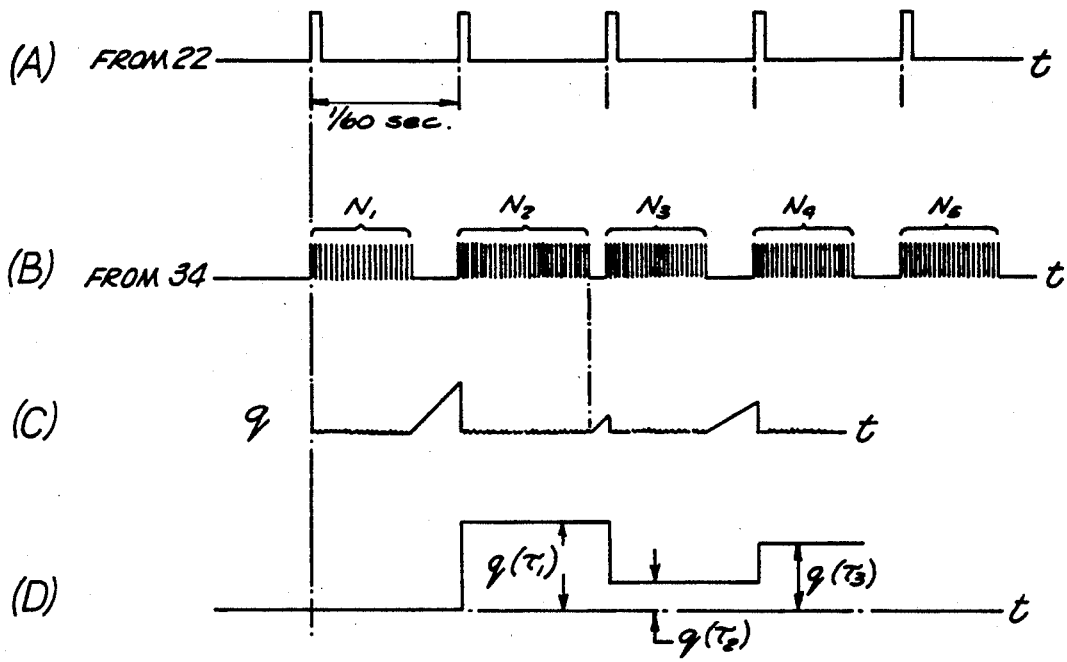
FIGS. 3(a) through 3(d) is a set of waveforms for illustrating the operation of the electronic shutter control for regulating charge accumulation by the CCD sensor of a camera in accordance with this invention.

Returning to the waveforms of FIGS. 3(a) through 3(d), the 60 Hz pulses provided by the internal clock of the microprocessor 22 are shown in FIG. 3(a). This pulse train is simultaneously applied to the CCD sensor 14 (and the on-chip transfer register 18), the programmable counter 28 and the multiplier 32, thereby synchronizing such devices.

FIG. 3(b) is a timing diagram representing the output of the programmable counter 28 via an AND gate 34. As mentioned earlier, the multiplier 32 multiplies the frequency of the pulses from the microprocessor 22 by 262.5, the number of lines that comprises a video frame. Thus, the multiplier 32 provides a 15,734 pulse per second (63.6 microsecond period pulse) train that is synchronized with the 60 Hz system clock. The foregoing values will be recognized as the horizontal sync frequency and the horizontal sync period or "line time" of the display 10. Since the scheme for shuttering the CCD sensor 14 requires that pulsed discharge signals occur only during the horizontal sync period of the video waveform, the output of the multiplier 32 comprises a pulse train that is properly synchronized for continually discharging charge from the sensor 14 and thereby preventing the accumulation or integration of charge over time.

The output of the multiplier 32 is applied to the programmable counter 28. The counter 28 is controlled by a signal generated within the microprocessor 22 and transmitted to the counter 28 via the conductor 30. This signal controls the number of stages of the counter 28 which must be triggered prior to driving the output of the counter 28 "low". Until such N stages have been "set", the input pulse train of frequency 15,734 pulses per second is applied to the CCD sensor 14 through the AND gate 34. The resultant waveform is shown in FIG. 3(b) to comprise, for each 1/60 second video display frame, N pulses of a pulse train having a period or separation of 63.6 microseconds followed by $16.7 - [(N) 63.6 \times 10^{-3}]$ milliseconds of "low" output.

FIG. 3(c) is a waveform representative of the charge accumulation or integration process occurring within a typical photo site or pixel of the CCD sensor 14 in response to the application of the waveform of FIG. 3(b). As can be seen, the charge accumulation q within a typical photo site is continually driven to "zero" by the application of the successive discharge pulses (from the programmable counter 28 via the AND gate 34) that coincide with the horizontal sync pulses of the CRT gun-activating video display waveform. After $N_i$ such discharge pulses during the i-th video frame period, the waveform applied to the sensor 14 goes low, permitting the accumulation of charge for $\tau_i$ milliseconds within the typical photo site. Accordingly, the accumulated charge is seen to "ramp" up until the arrival of the next 60 Hz clock pulse from the microprocessor 22, indicating the completion of display of the video frame resulting from the charge accumulation within the sensor 14 that occurred during the previous period of accumulation.

The waveform of FIG. 3(d) shows the charge accumulations of the sensor 14 that result from the values of $N_i$ determined by the microprocessor in accordance with the algorithm of FIG. 2. This waveform is, of course, not the same as the video waveform provided output by the on-chip transfer register 18 for application to the amplifier 24. However, it is based upon the charge accumulation collected in a "typical" photo site during the i-th collection period for actuation of the display 10 during period i+1. The waveform is, of course, instructive insofar as it demonstrates the effect of display period-to-display period variations in the amplitude of the video signal output of the on-chip register 18 that occur in response to variations in sensor exposure time responsive to the input of a new (doubled or halved) value of N. In an actual video waveform, all of the photo sites of the sensor 14 must be clocked out at a frequency that is sufficiently high to "dump" the charge accumulated in each of the photo sites of the sensor 14 in 1/60 second. Thus, the waveform of FIG. 3(d) may be thought of as representative of the "average" overall amplitude or intensity of a signal composed of a large number of discrete amplitude values, each of which will be effected proportionally by variation in the value of N provided by the microprocessor 22.

In operation, when it is determined that the current which the microcomputer 22 must send to the amplifier 24 will produce an increase of greater than +6 dB (indicating that the sensitivity of the CCD is low), the microcomputer 22 doubles the exposure time (resulting in a CCD output of twice the amplitude during the following field time). Additionally, the microprocessor 22 decreases the gain of the amplifier 24 by 6 dB, thereby compensating exactly for the increased signal output from the CCD. This shifts the operating point of the amplifier down by 6 dB so that it operates in the 0 to +6 dB optimum operating range (the control range of the amplifier 24 is, as mentioned earlier, typically −6 dB to +18 dB). Thus, the algorithm of FIG. 2 maintains the operating point of the amplifier 24 between 0 dB and +6 dB and fine, continuous control of signal intensity will be performed by the amplifier 24 while the shutter system of the sensor 14 will maintain a nominal output over a wide range of incident illumination.

The apparatus of the invention may be employed at exposure times of 1/30, 1/60, 1/125, 1/250, 1/500, 1/1000, 1/2000, 1/4000, 1/10,000 seconds but is not limited thereto. Furthermore, since the amplifier 24 may operate from −6 dB to +18 dB, the range of incident illumination within which the sensor will perform adequately is approximately 10,000:1 or 80 dB. The comparable control of exposure in the absence of the invention is about 8:1 or 18 dB.

Thus, it is seen that the present invention provides an improved method and apparatus for controlling the image output of a video camera. By employing the teachings of this invention one may utilize an otherwise-conventional endoscopic camera of the CCD type without significant sacrifice of detail even during those procedures that are characterized by significant variations in the intensity of incident illumination.

While this invention has been described with reference to its presently preferred embodiment, it is not limited thereto. For instance, the teachings of the invention, while of great utility to the field of video endoscopy, may be adapted to numerous other video applications in which the ability to control exposure without changing iris aperture (and, therefore, changing depth of field) is desirable. This invention is limited only insofar as defined by the following set of claims and includes all equivalents thereof.

What is claimed is:

1. Apparatus for regulating a signal, generated by a camera of a type that includes a CCD sensor for receiving an optical image and converting said image to an electrical signal and an output amplifier for receiving said signal and amplifying it to provide a video output, said amplifier being characterized by a predetermined, preferred range of gain, for driving a standard video display comprising, in combination:

a) means for measuring said video output;
   b) means for converting said output to a parameter;
   c) means for forming a difference between said parameter and a predetermined optimum value;
   d) means for converting said difference into a corresponding trial adjusted gain value of said amplifier;
   e) means for comparing said trial adjusted value of amplifier gain to said preferred range;
   f) means for adjusting the gain of said amplifier by a first factor and the charge accumulation time of said CCD sensor by a second factor when said trial adjusted value of amplifier gain falls outside said preferred range so that said amplifier remains adjustable within said preferred range; and g) means for coordinating the adjustment of said gain with the adjustment of said charge accumulation time so that the product of said first factor and said second factor is unity whereby the resulting camera image is substantially free of gain adjustment-related optical flicker.

2. Apparatus as defined in claim 1 wherein said means for adjusting the gain of said amplifier and the charge accumulation time of said sensor further includes:

a) means for doubling said charge accumulation time when said trial adjusted value exceeds the upper limit of said range and for reducing said charge accumulation time by one half when said trial adjusted value is less than the lower limit of said range; and c) means for reducing the gain of said amplifier by one half when said trial adjusted value exceeds the upper limit of said preferred range and for doubling the gain of said amplifier when said trial adjusted value is less than the lower limit of said preferred range.

3. Apparatus as defined in claim 2 wherein said means for doubling and reducing the charge accumulation time of said sensor by one-half further includes:

a) means for defining a video frame charge accumulation period;

b) means for exposing said sensor to an image for at least one charge accumulation period; and c) means for subdividing each charge accumulation period into a discharge period and a charge integration period.

4. Apparatus as defined in claim 3 wherein said means for subdividing each charge accumulation period includes:

a) means for determining a charge accumulation time equal to $1-N_i\tau$ where $\tau$ is the discharge pulse period and $N_i$ is the member of discharge pulses; and b) means for applying $N_i$ discharge pulses at frequency $1/\tau$ to said sensor.

5. Apparatus as defined in claim 4 wherein said means for subdividing includes a programmable counter.

6. A method for regulating a signal, generated by a camera of a type that includes a CCD sensor for receiving an optical image and converting said image to an electrical signal and an output amplifier for receiving said signal and amplifying it to provide a video output, said amplifier being characterized by a predetermined, preferred range of gain, for driving a standard video display comprising the steps of:

a) measuring said video output; then b) converting said output into a parameter measuring video intensity; then c) forming a difference between said parameter and a predetermined optimum value; then d) converting said difference into a trial adjusted value of amplifier gain; then e) comparing said trial adjusted value of amplifier gain to said preferred range of gain; then f) adjusting the gain of said amplifier by a first factor and the charge accumulation time of said CCD sensor by a second factor when said trial adjusted value of amplifier gain falls outside said preferred range so that said amplifier remains adjustable within said preferred range; and g) coordinating the adjustment to the gain with the adjustment to the charge accumulation time so that the product of said first factor and said second factor is unity whereby a resulting camera image is substantially without gain adjustment-related optical flicker.

7. A method as defined in claim 6 wherein the step of adjusting the gain of said amplifier and the charge accumulation time of said sensor further includes the steps of:

a) doubling said charge accumulation time of said sensor and reducing the gain of said amplifier by one half when said rial adjusted value exceeds the upper limit of said preferred range; and b) reducing said charge accumulation time by one half and doubling the gain of said amplifier when said trial adjusted value is less than the lower limit of said preferred range.

8. A method as defined in claim 7 wherein the step of adjusting the charge accumulation time of said amplifier further includes the steps of:

a) defining a video frame charge accumulation period; and b) exposing said sensor to an image for at least one charge one charge accumulation period; and then c) subdividing each charge accumulation period into a discharge period and a charge integration period.

9. A method as defined in claim 8 further including the steps of:

a) storing the amount of charge accumulated at each photosite of said sensor during each charge integration period; then b) forming said charge accumulations serially into a signal; and then c) applying said signal to said amplifier.

10. A method as defined in claim 9 wherein the step of subdividing each charge accumulation period further includes the step of applying a predetermined number of discharge pulses, $N_i$, per period i.

11. A method as defined in claim 10 further characterized in that:

a) said charge accumulation time is doubled by reducing $N_i$ by one-half; and b) said charge accumulation time is reduced in half by doubling $N_i$.

12. A method as defined in claim 8 comprising the additional steps of:

a) applying the output of said amplifier to a video display; and b) said video display is arranged to generate a video image in accordance with a predetermined video signal protocol; and c) a video frame is generated by said video display in response to the output of said amplifier with a frame rate equal to said charge accumulation period.

13. A method as defined in claim 6 wherein said parameter is the mean value of the output of said amplifier.

* * * * *